United States Patent
Vengerov

(10) Patent No.: US 7,444,316 B1
(45) Date of Patent: Oct. 28, 2008

(54) METHOD FOR SCHEDULING JOBS USING DISTRIBUTED UTILITY-BASED PREEMPTION POLICIES

(75) Inventor: David Vengerov, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 667 days.

(21) Appl. No.: 11/045,561

(22) Filed: Jan. 28, 2005

Related U.S. Application Data

(60) Provisional application No. 60/622,357, filed on Oct. 26, 2004, provisional application No. 60/579,912, filed on Jun. 14, 2004.

(51) Int. Cl.
*G06N 7/02* (2006.01)

(52) U.S. Cl. .......................... 706/52; 718/104; 718/105

(58) Field of Classification Search .................. 706/52; 718/105, 104
See application file for complete search history.

(56) References Cited

U.S. PATENT DOCUMENTS

2002/0198854 A1* 12/2002 Berenji et al. ................. 706/12

OTHER PUBLICATIONS

A. T. Wong, L. Oliker, W. T. C. Kramer, T. L. Kaltz and D.H. Bailey, "System Utilization Benchmark on the Cray T3E and IBM SP", 6th Workshop on Job Schedling Strategies for Parallel Processing, Apr. 2000 electronic copy can be found at http://citeseer.ist.psu.edu/298440.html.*

* cited by examiner

*Primary Examiner*—David Vincent
*Assistant Examiner*—Lut Wong
(74) *Attorney, Agent, or Firm*—Park, Vaughan& Fleming, LLP; Shun Yao

(57) ABSTRACT

One embodiment of the present invention provides a system that assigns jobs to a system containing a number of central processing units (CPUs). During operation, the system captures a current state of the system, which describes available resources on the system, characteristics of jobs currently being processed, and characteristics of jobs waiting to be assigned. The system then uses the current system state to estimate a long-term benefit to the system of not preempting any jobs currently being processed. If the benefit from preempting one or more jobs exceeds the benefit from not preempting any jobs, the system preempts one or more jobs currently being processed on the system with a new job.

14 Claims, 4 Drawing Sheets

METHOD FOR SCHEDULING JOBS USING DISTRIBUTED UTILITY-BASED PREEMPTION POLICIES

RELATED APPLICATIONS

This application hereby claims priority under 35 U.S.C. §119 to U.S. Provisional Patent Application No. 60/579,912 filed on 14 Jun. 2004, entitled "State-Based Policy for Oversubscribing Machines," by inventor David Vengerov, and to U.S. Provisional Patent Application No. 60/622,357 filed on 26 Oct. 2004, entitled "Reinforcement Learning Framework for Utility-Based Scheduling in Resource-Constrained Systems," by inventor David Vengerov. The subject matter of this application is also related to the subject matter in two co-pending non-provisional applications by the same inventor as the instant application and filed on the same day as the instant application entitled, "Method for Tuning State-based Scheduling Policies," having Ser. No. 11/045,561, and filing date Jan. 28, 2005, and "Method for Scheduling Jobs Using Distributed Utility-based Oversubscription Policies," having Ser. No. 11/045,560, and filing date Jan. 28, 2005.

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

The present invention relates to the process of scheduling jobs in a multiprocessor system.

To fully utilize the processing power of a multiprocessor system, it is important to schedule jobs properly. Conventionally, in a single-processor system, an earliest-deadline-first (EDF) approach can schedule all the jobs without missing any deadlines if such a system is underloaded. In an overloaded single-processor system, scheduling schemes based on Time Utility Functions perform better than EDF approaches, because such schemes typically attempt to maximize the total utility accrued by the system. However, although these approaches are viable solutions in single-processor systems, they become inadequate in a multiprocessor system where a job may request a number of CPUs for its processing.

The challenge of scheduling jobs requesting multiple CPUs often arises in multiprocessor systems, such as massively parallel computing systems, Grid systems, and data centers. One approach to meet this challenge is to use a greedy scheduling scheme, which inserts as many high-utility jobs into the schedule as early as possible. Such greedy schemes assume that the future performance of the system is unpredictable, and that it is therefore better to maximize the current benefit to the system based on current job utility. However, sometimes reducing the current job utility may help the system accrue better long-term utility. Therefore, a greedy approach may not achieve the best long-term accrued utility because it only maximizes instantaneous utility.

SUMMARY

One embodiment of the present invention provides a system that assigns jobs to a system containing a number of central processing units (CPUs). During operation, the system captures a current state of the system, which describes available resources on the system, characteristics of jobs currently being processed, and characteristics of jobs waiting to be assigned. The system then uses the current system state to estimate a long-term benefit to the system of not preempting any jobs currently being processed. If the benefit from preempting one or more jobs exceeds the benefit from not preempting any jobs, the system preempts one or more jobs currently being processed on the system with a new job.

In a variation of this embodiment, the system uses an alternate system state to estimate a long-term benefit to the system as if one or more jobs currently being processed on the system are preempted by the new job.

In a variation of this embodiment, preempting one or more jobs currently being processed on the system with the new job involves selecting the new job with which the preemption results in the most estimated long-term benefit to the system.

In a variation of this embodiment, capturing the state of the system involves describing the system state with a set of state variables. In addition, using the current system state to estimate the long-term benefit to the system involves feeding the set of state variables to a fuzzy rulebase to obtain an output which indicates a long-term expected utility.

In a further variation, the set of state variables include: a first variable $x1$, which denotes an average instantaneous utility received by currently busy CPUs on the system; a second variable $x2$, which denotes the remaining time until any of the jobs currently being processed is complete; and a third variable $x3$, which denotes the number of free CPUs on the system.

In a further variation, the fuzzy rulebase includes following fuzzy rules:

Rule 1: IF ($x1$ is $S1$) and ($x2$ is $S2$) and ($x3$ is $S3$) then output=$q[1]$;

Rule 2: IF ($x1$ is $S1$) and ($x2$ is $S2$) and ($x3$ is $L3$) then output=$q[2]$;

Rule 3: IF ($x1$ is $S1$) and ($x2$ is $L2$) and ($x3$ is $S3$) then output=$q[3]$;

Rule 4: IF ($x1$ is $S1$) and ($x2$ is $L2$) and ($x3$ is $L3$) then output=$q[4]$;

Rule 5: IF ($x1$ is $L1$) and ($x2$ is $S2$) and ($x3$ is $S3$) then output=$q[5]$;

Rule 6: IF ($x1$ is $L1$) and ($x2$ is $S2$) and ($x3$ is $L3$) then output=$q[6]$;

Rule 7: IF ($x1$ is $L1$) and ($x2$ is $L2$) and ($x3$ is $S3$) then output=$q[7]$;

Rule 8: IF ($x1$ is $L1$) and ($x2$ is $L2$) and ($x3$ is $L3$) then output=$q[8]$;

wherein $S1$, $S2$, and $S3$ denote lower bounds for $x1$, $x2$, and $x3$, respectively; wherein $L1$, $L2$, and $L3$ denote upper bounds for $x1$, $x2$, and $x3$, respectively; and wherein $q[i]$ ($i=1, \ldots, 8$) denote rulebase parameters.

In a further variation, activation of a fuzzy rule $i$ ($i=1, \ldots, 8$) (denoted as $A[i]$) is a product of degrees to which the state variables satisfy the preconditions for the fuzzy rules. The degrees to which the state variables satisfy the preconditions for the fuzzy rules are defined as:

degree to which ($x1$ is $S1$)=$1-x1$;

degree to which ($x1$ is $L1$)=$x1$;

degree to which ($x2$ is $S2$)=$1-x2/\text{MaxJobLength}$;

degree to which ($x2$ is $L2$)=$x2/\text{MaxJobLength}$;

degree to which ($x3$ is $S3$)=$(N-x3)/N$;

degree to which ($x3$ is $L3$)=$x3/N$;

wherein MaxJobLength is the maximum length of a job that can be scheduled on the system, and $N$ is the maximum number of CPUs on the system.

In a further variation, the output of the fuzzy rulebase Q is computed as follows:

$$Q = \frac{\sum_{i=1}^{8} A[i] \cdot q[i]}{\sum_{i=1}^{8} A[i]}.$$

In a further variation, the rulebase parameters q[i] are manually set or dynamically configured based on the state of the system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), memories, FPGAs (field programmable gate arrays), ASICs (application specific integrated circuits).

Job Scheduling in a Multiprocessor System

Figure 1:
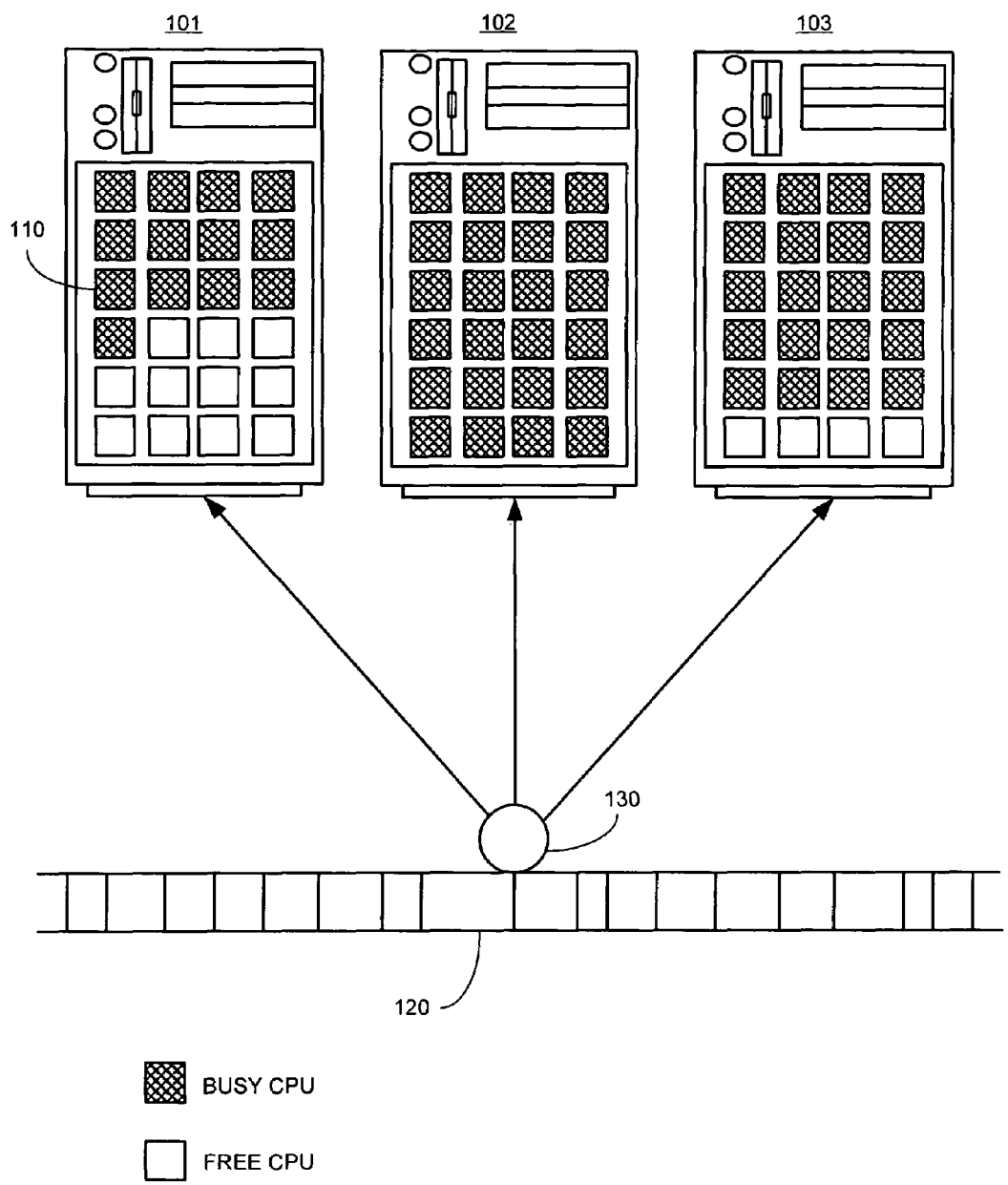
FIG. 1 illustrates a system containing three multiprocessor machines in accordance with an embodiment of the present invention.

FIG. 1 illustrates a system containing three multiprocessor machines in accordance with an embodiment of the present invention. This exemplary system contains three multiprocessor machines 101, 102, and 103. Each machine includes a number of CPUs, such as CPU 110. As new jobs arrive in a job queue 120, a job scheduler 130 makes scheduling decisions and dispatches new jobs to the machines.

In the example in FIG. 1, each job may request a number of CPUs. Scheduler 130 assigns a new job to a particular machine according to the state of the machine. In this example, machine 102's CPUs are all busy. Machines 101 and 103 both have a number of free CPUs.

One embodiment of the present invention adopts a value function which estimates the long-term benefit to each machine with a given machine state (expressed in, e.g., the average utility per time unit obtained from all completed jobs). To improve the accuracy of the estimation process, the parameters of the value function can be dynamically tuned through reinforcement learning. The result of this estimation process is then used to make scheduling decisions, such as preemption and oversubscription. This state-based, self-tuning scheduling mechanism can produce better accrued utility for the system than a greedy mechanism does, because it attempts to evaluate future benefit of each scheduling decision.

In one embodiment of the present invention, the long-term benefit to the system is expressed in terms of job utility. An incoming job may request up to N CPUs, where N is the number of CPUs in a machine. The job execution time varies between jobs and depends on the actual number of CPUs assigned to each job. Each job's utility is computed based on its unit utility, the value of which decreases with the corresponding job completion time (including waiting time).

The final utility of a job is its unit utility multiplied by K×L, where K is the number of CPUs requested by the job and L is the job's ideal execution time if the job were assigned to K CPUs. The K×L factor is introduced to reflect the assumption that the larger/longer jobs should receive the same scheduling priority as the smaller/shorter jobs. In this way, the scheduler is impartial between scheduling a job requesting K CPUs and having an ideal execution time L and scheduling K×L jobs each of which requests one CPU and has an ideal execution time of one time unit. Note that if a job is assigned fewer CPUs than it requests, its execution time increases and its unit utility decreases correspondingly.

If a job actually receives K' CPUs (note that K' is the number of CPUs actually assigned to the job, and therefore is typically less than or equal to K which is the number of CPUs requested by the job), and its expected completion time is L', the instantaneous utility received by each CPU is defined as U/(K'×L'), where U is the final utility of the job.

Figure 2:
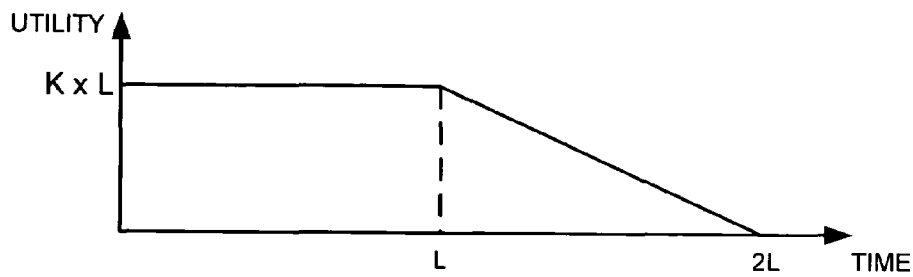
FIG. 2 presents a plot of an exemplary time utility function in accordance with an embodiment of the present invention.

FIG. 2 presents a plot of an exemplary time utility function in accordance with an embodiment of the present invention. As shown in FIG. 2, a job's utility is K×L when its execution time is less than or equal to L. Its utility decreases when its actual execution time (including waiting time) exceeds L. In the example utility function shown in FIG. 2, the utility function linearly decreases to 0 as the job's execution time reaches 2L. Note that FIG. 2 shows only one exemplary definition of utility function. Other forms of utility functions may also be used.

State-Based Scheduling Policies

One embodiment of the present invention includes a scheduler that can use three scheduling techniques: best-fit scheduling, preemption, and oversubscription. With best-fit scheduling, each machine selects the job to be scheduled with the tightest fit for this machine (i.e., the job that results in the fewest free CPUs after the job is scheduled). In addition to best-fit scheduling, the scheduler also considers preemption and/or oversubscription if the machine cannot accommodate any new jobs.

For preemption, the scheduler decides whether temporarily suspending one or more currently running jobs to accommodate a new job can benefit the machine (e.g., to improve long-term accrued job utility). The scheduler makes preemption decisions based on a set of preemption policies and the current state of the machine. The suspended jobs are typically placed in a queue and can be resumed when sufficient CPUs become available.

For oversubscription, the scheduler decides whether to forcefully schedule a new job to a machine, even if the machine has fewer free CPUs than what the job requests. Oversubscription typically results in a longer execution time for the scheduled job. However, it may benefit the system in the long term because the CPUs that would otherwise be idle will be doing some productive work. The scheduler makes oversubscription decisions based on a set of oversubscription policies and the current state of the machine.

The above mentioned scheduling policies allow the scheduler to select a scheduling configuration that provides the best starting point for a machine's future operations by maximizing the long-term utility of all jobs. In one embodiment of the present invention, a component of this scheduling mechanism is the reinforcement learning process for the value function (i.e., long-term expected utility sum) for each machine. The output of the value function is typically based on a machine state as its input, which includes the current state of the machine's resources, the jobs it is executing, and the jobs that are waiting to be scheduled. Once this value function is determined, the benefit of any scheduling action can be evaluated, and the scheduler can determine whether to take this action.

One embodiment of the present invention adopts a parameterized fuzzy rulebase as the value function. The input to the fuzzy rulebase is a set of state variables which describe a machine state. For instance, such a set of state variables may include x1, x2, and x3, where x1 denotes the average instantaneous utility received by the currently busy CPUs on the machine;

x2 denotes the remaining time until any of the currently running jobs is complete; and x3 denotes the number of free CPUs on the machine.

Note that other definitions of state variables can also be used, as long as they are sufficient for evaluation of the average future job utility per time unit.

Given these state variables, an exemplary fuzzy rulebase may include the following fuzzy rules:

Rule 1: IF (x1 is S1) and (x2 is S2) and (x3 is S3) then output=q[1];

Rule 2: IF (x1 is S1) and (x2 is S2) and (x3 is L3) then output=q[2];

Rule 3: IF (x1 is S1) and (x2 is L2) and (x3 is S3) then output=q[3];

Rule 4: IF (x1 is S1) and (x2 is L2) and (x3 is L3) then output=q[4];

Rule 5: IF (x1 is L1) and (x2 is S2) and (x3 is S3) then output=q[5];

Rule 6: IF (x1 is L1) and (x2 is S2) and (x3 is L3) then output=q[6];

Rule 7: IF (x1 is L1) and (x2 is L2) and (x3 is S3) then output=q[7]; and

Rule 8: IF (x1 is L1) and (x2 is L2) and (x3 is L3) then output=q[8].

In this fuzzy rulebase, S1, S2, and S3 denote lower bounds for x1, x2, and x3, respectively; and L1, L2, and L3 denote upper bounds for x1, x2, and x3, respectively. In addition, q[i] (i=1, . . . , 8) denote rulebase parameters, which are the output of each rule. The activation (weight) of each fuzzy rule i, A[i], is the product of the degrees to which the state variables x1, x2, and x3 satisfy the preconditions (e.g., "x1 is L1," "x2 is S2," etc). These degrees are defined as follows:

degree to which (x1 is S1)=1−x1;
degree to which (x1 is L1)=x1;
degree to which (x2 is S2)=1−x2/MaxJobLength;
degree to which (x2 is L2)=x2/MaxJobLength;
degree to which (x3 is S3)=(N−x3)/N;
degree to which (x3 is L3)=x3/N;

where MaxJobLength denotes the maximum length of a job that can be scheduled, and N denotes the maximum number of CPUs on the machine. The output of the fuzzy rulebase is computed as follows:

$$Q = \frac{\sum_{i=1}^{8} A[i] \cdot q[i]}{\sum_{i=1}^{8} A[i]}.$$

Figure 3:
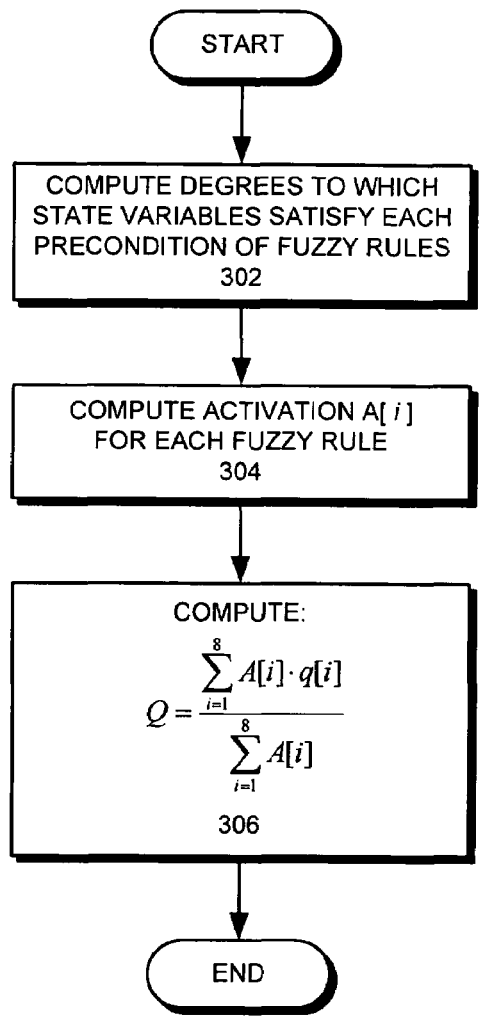
FIG. 3 presents a flow chart illustrating the process of computing a Q value for a system according to a fuzzy rulebase in accordance with an embodiment of the present invention.

FIG. 3 presents a flow chart illustrating the process of computing a Q value for a system according to a fuzzy rulebase in accordance with an embodiment of the present invention. During operation, the system first computes degrees to which the state variables satisfy each precondition of the fuzzy rules (step 302). The system then computes the activation A[i] for each fuzzy rule (step 304). Next, the system computes the output Q of the fuzzy rulebase according to $$Q = \frac{\sum_{i=1}^{8} A[i] \cdot q[i]}{\sum_{i=1}^{8} A[i]}.$$

The parameters q[i] are chosen to produce a Q value that reflects the expected long-term utility of the system. Hence, by evaluating Q values with different input state variables, the scheduler can make scheduling decisions to maximize the long-term benefit to the system.

Figure 4:
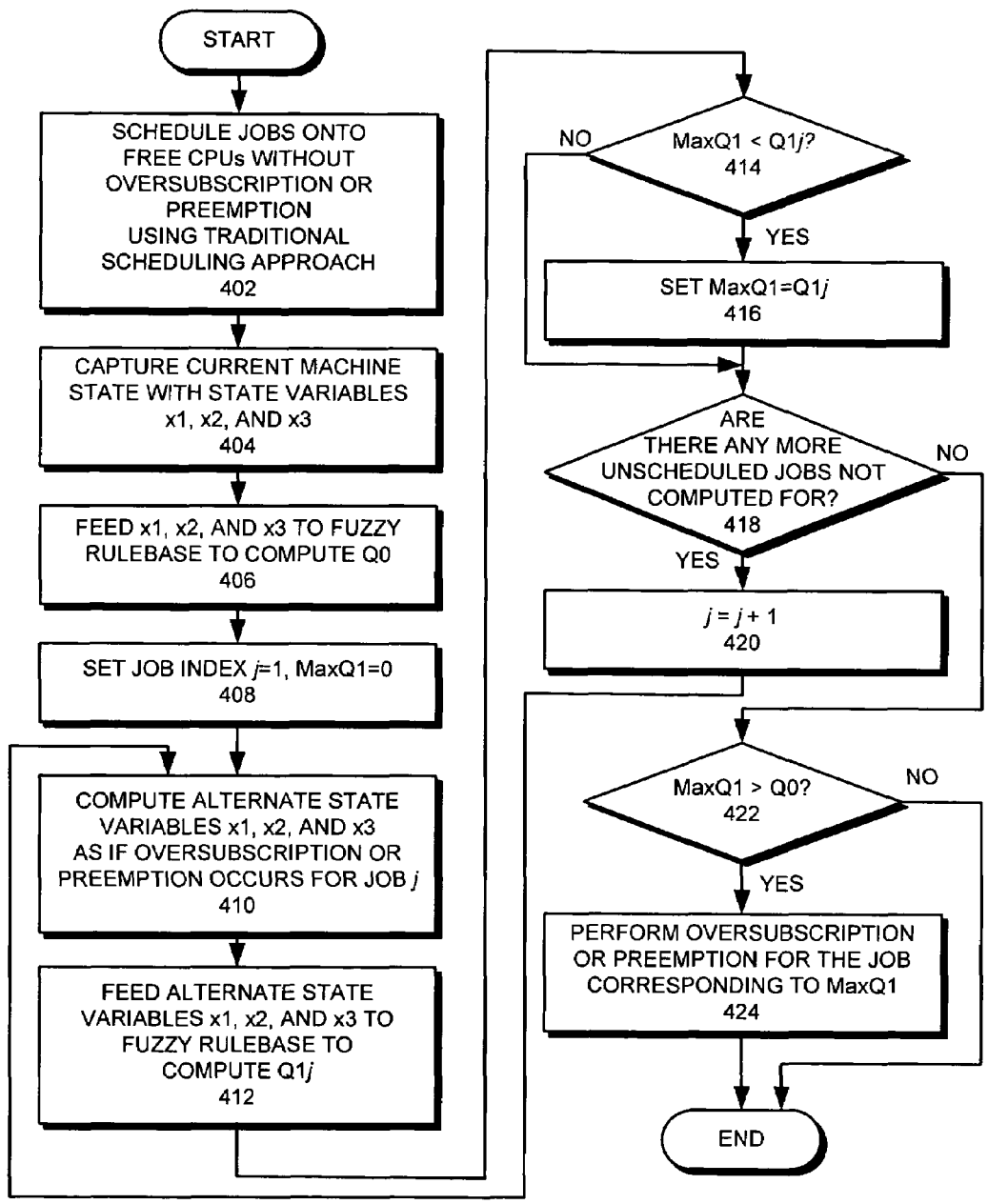
FIG. 4 presents a flow chart illustrating the process of making state-based scheduling decisions in accordance with an embodiment of the present invention.

FIG. 4 presents a flow chart illustrating the process of making state-based scheduling decisions in accordance with an embodiment of the present invention. During operation, the system first schedules jobs onto free CPUs without oversubscription or preemption, using a traditional scheduling approach such as best-fit scheduling (step 402). Next, the system captures the current machine state with state variables x1, x2, and x3 (step 404). The system then feeds the current state x1, x2, and x3 to the fuzzy rulebase to compute Q0, which indicates the long-term benefit to the system if the scheduler takes no action (e.g., no oversubscription or preemption) (step 406).

The system subsequently scans through all the new jobs waiting to be scheduled and determines whether performing oversubscription or preemption for a job would result in a larger Q value. The system first sets a job index j to be 1, and sets MaxQ1 to be 0 (step 408). MaxQ1 is a variable to store the largest Q value. Note that in this example, only one job is allowed to be scheduled to a machine with oversubscription or preemption. Therefore, the scheduler chooses the job that would result in the largest Q value. Next, the system compute a set of alternate state variables x1, x2, and x3 as if oversubscription or preemption occurs for job j (step 410). (Note that in case of preemption, the system may preempt a sufficient number of currently running jobs with the lowest utility to accommodate the new job.) The system then feeds these alternate state variables to the fuzzy rulebase and computes a corresponding Q value, Q1j (step 412).

After computing Q1j, the system compares MaxQ1 with Q1j (step 414). If MaxQ1 is less than Q1j, the system sets MaxQ1 to be Q1j (step 416). Otherwise, the system determines whether there are more unscheduled jobs that have not been computed for (step 418). If so, the system increments job index j (step 420) and continues to compute the Q value for the next unscheduled job (step 410). Otherwise, the system determines whether MaxQ1 is larger than Q0 (step 422). If so, the system performs oversubscription or preemption for the job corresponding to MaxQ1 (step 424), because this leads to more long-term benefit to the system.

Tuning Parameters for Fuzzy Rulebase

The fuzzy rulebase is an instance of a linear parameterized function approximation architecture, where the normalized weight of each rule is a basis function and q[i] are tunable parameters. One embodiment of the present invention adopts a reinforcement learning-based tuning mechanism to dynamically tune the parameters.

During operation, the system checks whether the state of a machine has changed at regular intervals of dt. The state of a machine changes when a) an oversubscription occurs;

b) a preemption occurs and the machine is not oversubscribed prior to the preemption; or c) the machine is not oversubscribed, and a job has finished.

When a machine state changes, the tuning mechanism adjusts the value of each q[i] based on the improvement of utilities and the improvement of Q value of the machine. Specifically, the improvement of job utilities may be evaluated by performing the following computations at regular intervals of dt:

1) Compute SumJobUtil, which is the sum of the following value over all currently running jobs: (number of CPUs allocated to the job×expected job utility)/(expected job completion time×number of CPUs originally requested by the job).

2) Compute SumStateU and TotalSumU. SumStateU denotes the accrued average utility per CPU between two state changes, and can be computed as SumStateU=SumStateU+SumJobUtil/n, where n is the total number of CPUs in the machine. Note that SumStateU is reset to zero after every state change. TotalSumU denotes the accrued average utility per CPU in the past, and can be computed as TotalSumU=TotalSumU+SumJobUtil/n. Note that TotalSumU is not reset to zero after every state change.

When a state change occurs, the improvement of utilities can be computed as dR=(AveStepUtil−AveUtil)×TimePassed/dt, where AveStepUtil denotes the average utility over the time period between the last two state changes attributed to dt; AveUtil denotes the overall average utility over the past attributed to dt; and wherein TimePassed denotes the amount of time elapsed between the last two state changes. AveStepUtil can be computed as AveStepUtil=dt×SumStateU/TimePassed. AveUtil can be computed as AveUtil=dt×TotalSumU/t, where t denotes the total amount of time elapsed since the initialization of the system.

The adjustment of q[i] also takes into consideration of the learning rate, LR, and the previously computed weight for rule i before the state change, OldA[i]. Learning rate LR reflects the fact that as the system time progresses, the adjustment to q[i] ideally becomes increasingly small to maintain a stable scheduling policy. In one embodiment of the present invention, LR is inversely proportional to the total number of tunings performed to q[i]. Hence, the adjustment to q[i] can be defined as:

q[i]=q[i]+LR×(dR+dQ)×OldA[i], where dQ denotes to the difference of Q values between the last two states.

Figure 5:
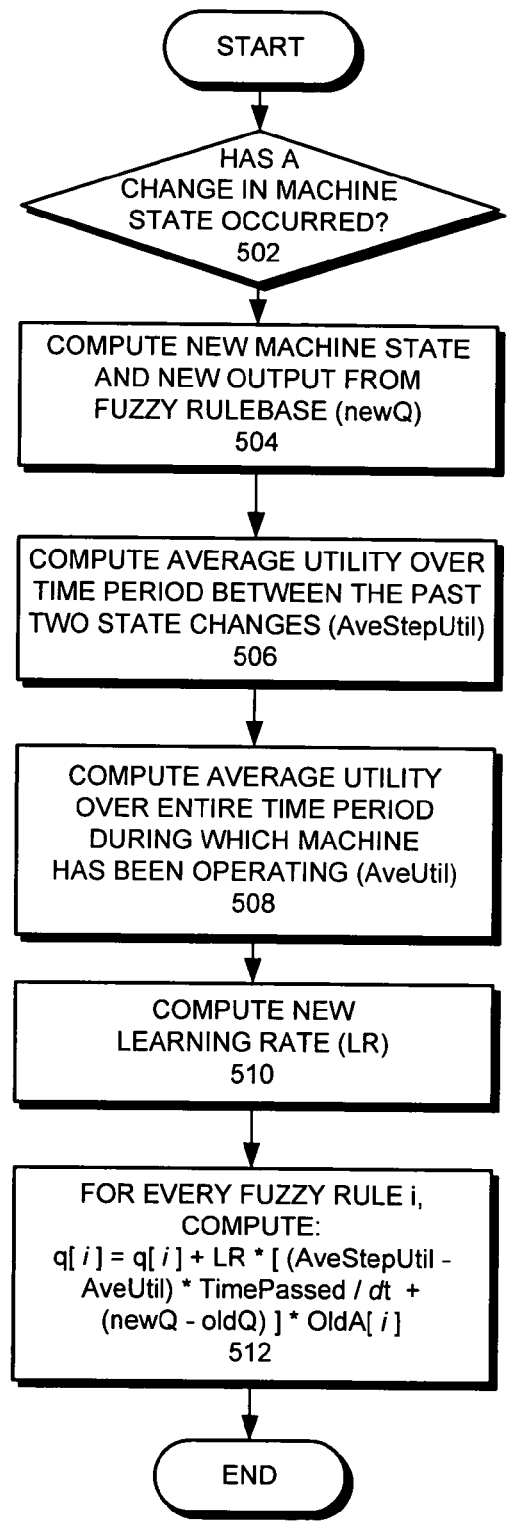
FIG. 5 presents a flow chart illustrating the process of tuning parameters used in the fuzzy rulebase using reinforcement learning technique in accordance with an embodiment of the present invention.

FIG. 5 presents a flow chart illustrating the process of tuning parameters used in the fuzzy rulebase using reinforcement learning technique in accordance with an embodiment of the present invention. During operation, the system starts by determining whether a state change has occurred (step 502). The system then computes the new machine state and the new output (newQ) from the fuzzy rulebase (step 504). Next, the system computes the average utility over the time period between the past two state changes (AveStepUtil) (step 506). The system also computes the average utility over the entire time period during which the machine has been operating (AveUtil) (step 508).

Subsequently, the system computes the learning rate LR based on the total number of tunings performed in the past (step 510). For every fuzzy rule i, the system then computes q[i]=q[i]+LR×[(AveStepUtil−AveUtil)×TimePassed/dt+ (newQ−oldQ)]×OldA[i], wherein oldQ denotes the Q value from the previous state.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for assigning jobs to a system containing a number of central processing units (CPUs), comprising:

capturing a current state of the system, which describes available resources on the system, characteristics of jobs currently being processed, and characteristics of jobs waiting to be assigned, wherein capturing the state of the system involves describing the system state with respect to the CPUs and jobs with a set of state variables;

using the current system state to estimate a long-term benefit to the system of not preempting any jobs currently being processed by feeding the set of state variables to a fuzzy rulebase to obtain an output which indicates a long-term expected utility wherein the output of the fuzzy rulebase Q is computed as follows:

$$Q = \frac{\sum_{i=1}^{8} A[i] \cdot q[i]}{\sum_{i=1}^{8} A[i]},$$

wherein q[i] (i=1, . . . , 8) denote rulebase parameters, and wherein activation of a fuzzy rule i (i=1, . . . , 8), which is denoted as A[i], is a product of degrees to which the state variables satisfy the preconditions for the fuzzy rules;

identifying a new job with which the preemption of jobs currently being processed in the system results in a higher Q value; and preempting one or more jobs currently being processed on the system with the identified new job.

2. The method of claim 1, wherein identifying the new job with which the preemption of jobs currently being processed in the system results in a higher Q value involves identifying the new job with the highest Q value.

3. The method of claim 1, wherein the set of state variables include:
   a first variable x1, which denotes an average instantaneous utility received by currently busy CPUs on the system;
   a second variable x2, which denotes the remaining time until any of the jobs currently being processed is complete; and
   a third variable x3, which denotes the number of free CPUs on the system.

4. The method of claim 3, wherein the fuzzy rulebase includes following fuzzy rules:
   Rule 1: IF (x1 is S1) and (x2 is S2) and (x3 is S3) then output=q[1];
   Rule 2: IF (x1 is S1) and (x2 is S2) and (x3 is L3) then output=q[2];
   Rule 3: IF (x1 is S1) and (x2 is L2) and (x3 is S3) then output=q[3];
   Rule 4: IF (x1 is S1) and (x2 is L2) and (x3 is L3) then output=q[4];
   Rule 5: IF (x1 is L1) and (x2 is S2) and (x3 is S3) then output=q[5];
   Rule 6: IF (x1 is L1) and (x2 is S2) and (x3 is L3) then output=q[6];
   Rule 7: IF (x1 is L1) and (x2 is L2) and (x3 is S3) then output=q[7];
   Rule 8: IF (x1 is L1) and (x2 is L2) and (x3 is L3) then output=q[8];
   wherein S1, S2, and S3 denote lower bounds for x1, x2, and x3, respectively;
   wherein L1, L2, and L3 denote upper bounds for x1, x2, and x3, respectively; and
   wherein q[i] (i=1, . . . , 8) denote rulebase parameters.

5. The method of claim 4, wherein activation of a fuzzy rule i (i=1, . . . , 8) (denoted as A[i]) is a product of degrees to which the state variables satisfy the preconditions for the fuzzy rules; and
   wherein the degrees to which the state variables satisfy the preconditions for the fuzzy rules are defined as:
      degree to which (x1 is S1)=1−x1;
      degree to which (x1 is L1)=x1;
      degree to which (x2 is S2)=1−x2/MaxJobLength;
      degree to which (x2 is L2)=x2/MaxJobLength;
      degree to which (x3 is S3)=(N−x3)/N;
      degree to which (x3 is L3)=x3/N;
      wherein MaxJobLength is the maximum length of a job that can be scheduled on the system, and N is the maximum number of CPUs on the system.

6. The method of claim 4, wherein the rulebase parameters q[i] are manually set or dynamically configured based on the state of the system.

7. A computer-readable storage medium storing instructions that when executed by a computer cause the computer to perform a method for assigning jobs to a system containing a number of central processing units (CPUs), comprising:
   capturing a current state of the system, which describes available resources on the system, characteristics of jobs currently being processed, and characteristics of jobs waiting to be assigned, wherein capturing the state of the system involves describing the system state with respect to the CPUs and jobs with a set of state variables;
   using the current system state to estimate a long-term benefit to the system of not preempting any jobs currently being processed by feeding the set of state variables to a fuzzy rulebase to obtain an output which indicates a long-term expected utility, wherein the output of the fuzzy rulebase Q is computed as follows:

$$Q = \frac{\sum_{i=1}^{8} A[i] \cdot q[i]}{\sum_{i=1}^{8} A[i]},$$

wherein q[i] (i=1, . . . , 8) denote rulebase parameters and wherein activation of a fuzzy rule i (i=1, . . . , 8), which is denoted as A[i], is a product of degrees to which the state variables satisfy the preconditions for the fuzzy rules;
   identifying a new job with which the preemption of jobs currently being processed in the system results in a higher Q value; and
   preempting one or more jobs currently being processed on the system with the identified new job.

8. The computer-readable storage medium of claim 7, wherein identifying the new job with which the preemption of jobs currently being processed in the system results in a higher Q value involves identifying the new job with the highest Q value.

9. The computer-readable storage medium of claim 7, wherein the set of state variables include:
   a first variable x1, which denotes an average instantaneous utility received by currently busy CPUs on the system;
   a second variable x2, which denotes the remaining time until any of the jobs currently being processed is complete; and
   a third variable x3, which denotes the number of free CPUs on the system.

10. The computer-readable storage medium of claim 9, wherein the fuzzy rulebase includes following fuzzy rules:
    Rule 1: IF (x1 is S1) and (x2 is S2) and (x3 is S3) then output=q[1];
    Rule 2: IF (x1 is S1) and (x2 is S2) and (x3 is L3) then output=q[2];
    Rule 3: IF (x1 is S1) and (x2 is L2) and (x3 is S3) then output=q[3];
    Rule 4: IF (x1 is S1) and (x2 is L2) and (x3 is L3) then output=q[4];
    Rule 5: IF (x1 is L1) and (x2 is S2) and (x3 is S3) then output=q[5];
    Rule 6: IF (x1 is L1) and (x2 is S2) and (x3 is L3) then output=q[6];
    Rule 7: IF (x1 is L1) and (x2 is L2) and (x3 is S3) then output=q[7];
    Rule 8: IF (x1 is L1) and (x2 is L2) and (x3 is L3) then output=q[8];
    wherein S1, S2, and S3 denote lower bounds for x1, x2, and x3, respectively;
    wherein L1, L2, and L3 denote upper bounds for x1, x2, and x3, respectively; and
    wherein q[i] (i=1, . . . , 8) denote rulebase parameters.

11. The computer-readable storage medium of claim 10, wherein activation of a fuzzy rule i (i=1, . . . , 8) (denoted as A[i]) is a product of degrees to which the state variables satisfy the preconditions for the fuzzy rules; and
    wherein the degrees to which the state variables satisfy the preconditions for the fuzzy rules are defined as:
       degree to which (x1 is S1)=1−x1;
       degree to which (x1 is L1)=x1;
       degree to which (x2 is S2)=1−x2/MaxJobLength;
       degree to which (x2 is L2)=x2/MaxJobLength;

degree to which (x3 is S3)=(N−x3)/N;
degree to which (x3 is L3)=x3/N;
wherein MaxJobLength is the maximum length of a job that can be scheduled on the system, and N is the maximum number of CPUs on the system.

12. The computer-readable storage medium of claim 10, wherein the rulebase parameters q[i] are manually set or dynamically configured based on the state of the system.

13. A computer system that assigns jobs to a number of central processing units (CPUs), comprising:
one or more CPUs;
an I/O mechanism;
a memory system; and
software stored in the memory system, wherein the software is configured to:
capture a current state of the system, which describes available resources on the system, characteristics of jobs currently being processed, and characteristics of jobs waiting to be assigned, wherein capturing the state of the system involves describing the system state with respect to the CPUs and jobs with a set of state variables;
use the current system state to estimate a long-term benefit to the system of not preempting any jobs currently being processed by feeding the set of state variables to a fuzzy rulebase to obtain an output which indicates a long-term expected utility, wherein the output of the fuzzy rulebase Q is computed as follows:

$$Q = \frac{\sum_{i=1}^{8} A[i] \cdot q[i]}{\sum_{i=1}^{8} A[i]},$$

wherein q[i] (i=1, . . . , 8) denote rulebase parameters and wherein activation of a fuzzy rule i (i=1, . . . , 8), which is denoted as A[i], is a product of degrees to which the state variables satisfy the preconditions for the fuzzy rules;
identify a new job with which the preemption of jobs currently being processed in the system results in a higher Q value; and
to preempt one or more jobs currently being processed on the system with the identified new job.

14. The computer system of claim 13, wherein while identifying the new job with which the preemption of jobs currently being processed in the system results in a higher Q value the software is configured to identify the new job with the highest Q value.

* * * * *